United States Patent
Kim et al.

(10) Patent No.: US 11,242,846 B2
(45) Date of Patent: *Feb. 8, 2022

(54) LUBRICATING OIL SUPPLY APPARATUS AND COMPRESSOR USING LUBRICATING OIL SUPPLY APPARATUS

(71) Applicant: LG ELECTRONICS INC., Seoul (KR)

(72) Inventors: Young Hwan Kim, Seoul (KR); Wonseok Kang, Seoul (KR); Jinkook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 16/136,403

(22) Filed: Sep. 20, 2018

(65) Prior Publication Data

US 2019/0093647 A1 Mar. 28, 2019

(30) Foreign Application Priority Data

Sep. 28, 2017 (KR) .......................... 10-2017-0126549

(51) Int. Cl.
| | | |
|---|---|---|
| *F04C 2/10* | (2006.01) | |
| *F04B 39/02* | (2006.01) | |
| *F04B 35/01* | (2006.01) | |
| *F16N 7/36* | (2006.01) | |

(Continued)

(52) U.S. Cl.
CPC .......... *F04B 39/0276* (2013.01); *F04B 35/01* (2013.01); *F04B 39/0094* (2013.01); *F04B 39/0253* (2013.01); *F04B 39/0284* (2013.01); *F04B 39/0292* (2013.01); *F04C 2/10* (2013.01); *F04C 2/102* (2013.01); *F04C 2/103* (2013.01);

(Continued)

(58) Field of Classification Search
CPC .... F04B 39/0246; F04B 39/0261; F04C 2/10; F04C 2/102; F04C 2/103
USPC .......................................................... 418/166
See application file for complete search history.

(56) References Cited

U.S. PATENT DOCUMENTS 3,307,480 A * 3/1967 Kropiwnicki ........... F04C 14/04
                                                                             418/32
3,311,292 A * 3/1967 Connor ................. F04D 29/542
                                                                        415/211.2

(Continued)

FOREIGN PATENT DOCUMENTS

DE        3427972 A1 * 2/1986 ............ F04C 29/025
GB         945871 A * 1/1964 ............ F25B 31/002

(Continued)

OTHER PUBLICATIONS

International Search Report dated Jan. 9, 2019 issued in Application No. PCT/KR2018/010382.

(Continued)

*Primary Examiner* — F Daniel Lopez
*Assistant Examiner* — Matthew Wiblin
(74) *Attorney, Agent, or Firm* — KED & Associates LLP

(57) ABSTRACT

A lubricating oil supply apparatus may include a rotational portion that rotates together with a rotational shaft and a fixed portion that maintains a fixed location thereof and supplies oil through a space that circles with respect to a rotational center of the rotational portion, thereby supplying oil regardless of a rotational direction of the rotational shaft.

9 Claims, 14 Drawing Sheets

(51) Int. Cl.
*F04B 39/00* (2006.01)
*F04B 35/04* (2006.01)

(52) U.S. Cl.
CPC .............. *F16N 7/366* (2013.01); *F04B 35/04* (2013.01); *F16N 2210/16* (2013.01)

(56) References Cited

U.S. PATENT DOCUMENTS

| | | | |
|---|---|---|---|
| 3,456,874 A * | 7/1969 | Graper | F04B 39/1073 |
| | | | 417/534 |
| 5,941,346 A | 8/1999 | Oh | |
| 6,478,116 B1 * | 11/2002 | Klausen | F04B 39/0261 |
| | | | 184/31 |
| 8,739,933 B2 | 6/2014 | Wagner et al. | |
| 9,850,904 B2 * | 12/2017 | Toyama | F04C 23/008 |
| 11,022,116 B2 * | 6/2021 | Kim | F04C 15/06 |
| 2015/0030487 A1 * | 1/2015 | Toyama | F04C 23/008 |
| | | | 418/55.1 |
| 2015/0086403 A1 * | 3/2015 | Schweiher | F04C 2/102 |
| | | | 418/15 |

FOREIGN PATENT DOCUMENTS

| | | | |
|---|---|---|---|
| GB | 1396201 A * | 6/1975 | ......... F04C 2/103 |
| JP | 2011012630 A * | 1/2011 | |
| JP | 2013036459 A * | 2/2013 | |
| KR | 10-0195944 | 6/1999 | |
| KR | 10-2003-0010963 | 2/2003 | |
| KR | 10-2015-0075445 | 7/2015 | |
| KR | 10-2016-0127361 | 11/2016 | |
| KR | 10-2018-0100903 | 9/2018 | |

OTHER PUBLICATIONS

Korean Notice of Allowance dated Jan. 22, 2019 issued in Application No. 10-2017-0126549.

* cited by examiner

PRIOR ART

PRIOR ART

PRIOR ART

LUBRICATING OIL SUPPLY APPARATUS AND COMPRESSOR USING LUBRICATING OIL SUPPLY APPARATUS

CROSS-REFERENCE TO RELATED APPLICATION(S)

This application claims priority under 35 U.S.C. § 119 to Korean Application No. 10-2017-0126549, filed on Sep. 28, 2017, whose entire disclosure is herein incorporated by reference.

BACKGROUND

1. Field

A lubricating oil supply apparatus and a compressor using lubricating oil supply apparatus.

2. Background

A compressor is an apparatus to increase pressure by compressing gas. The compressor is categorized into a reciprocating type compressor in which gas suctioned into a cylinder is compressed and discharged by a piston, and a scroll type compressor in which gas is compressed by rotating two scrolls relative to each other based on how gas is compressed.

The compressor is provided with a rotational shaft to provide a force for compressing gas. Also, as the compressor includes a large number of mechanical components that are subject to mutual friction, it is required to lubricate the mechanical components.

Referring to FIG. 1, the reciprocating type compressor may have a structure in which a frame 20 is accommodated in a housing 10. The frame 20 may support the rotational shaft 50. A lubricating oil supply path 53 may be provided in the rotational shaft 50, and a lubricating oil supply portion 60 may be provided at a lower end of the rotational shaft 50. Lubricating oil may be stored in a lower portion of an inner space of the housing 10, and a lower end of the lubricating oil supply portion 60 may be submerged in the lubricating oil.

Referring to FIG. 2, the lubricating oil supply portion 60 may include a rotational portion 62 that rotates together with the rotational shaft 50 and a fixed portion 61 that is fixed to the frame 20 and does not rotate. A spiral protrusion may be provided on an outer circumferential surface of the fixed portion 61, and the fixed portion 61 may be inserted into an inner circumferential surface of the rotational portion 62. When the rotational portion 62 rotates in line with rotation of the rotational shaft 50, oil may move upward along a space between the spiral protrusions of the fixed portion 61. As a result, the oil may be supplied upward.

Referring to FIGS. 1 and 3, the oil supplied upward by the lubricating oil supply portion 60 may move to a place where lubrication is required through the lubricating oil supply path 53 provided in the rotational shaft 50. The lubricating oil supply path 53 may be branched. The lubricating oil supply path 53 branched to the outer circumferential surface of the rotational shaft 50 may have a groove shape that extends spirally along a longitudinal direction of the rotational shaft 50, as illustrated in FIG. 3. Therefore, when the rotational shaft 50 rotates in a state of being supported by a rotational supporting portion 25, the oil may move upward along a groove of the outer circumferential surface of the rotational shaft 50.

The above-described oil pump structure may use a rotational force of the rotational shaft 50 and viscosity of oil. In this structure, oil may be supplied when a spiral direction of the fixed portion 61 and a spiral direction of the outer circumferential surface of the rotational shaft 50 are formed in any one direction to correspond to a rotational direction of the rotational shaft 50. That is, when the rotational shaft 50 rotates in an opposite direction due to a motor-side power source for rotating the rotational shaft 50 being connected to an opposite polarity, the oil pump structure may not supply oil.

The reciprocating type compressor has an advantage that the compressor operates regardless of a rotational direction of the rotational shaft 50. However, when a structure in which oil is supplied only when the rotational shaft 50 rotates in any one direction as described above is applied to the reciprocating type compressor, the reciprocating type compressor may not exhibit the same advantage as described above.

In the reciprocating type compressor, the rotational shaft may be designed so that rotational shaft operates bi-directionally. For example, a design that makes it possible to have high efficiency in a high speed operation mode when rotating in a first direction and to have high efficiency in a low speed operation mode when rotating in a second direction opposite to the first direction may be required. However, it is not possible to apply the above-described oil pump structure of FIGS. 1 to 3 to the rotational shaft of the compressor designed to be rotatable bi-directionally. Therefore, when designing a compressor capable of rotating bi-directionally as described above, a pump structure capable of supplying oil is required regardless of a rotational direction.

BRIEF DESCRIPTION OF THE DRAWINGS

Embodiments will be described with reference to the following drawings in which like reference numerals refer to like elements, and wherein.

DETAILED DESCRIPTION

Figure 1:
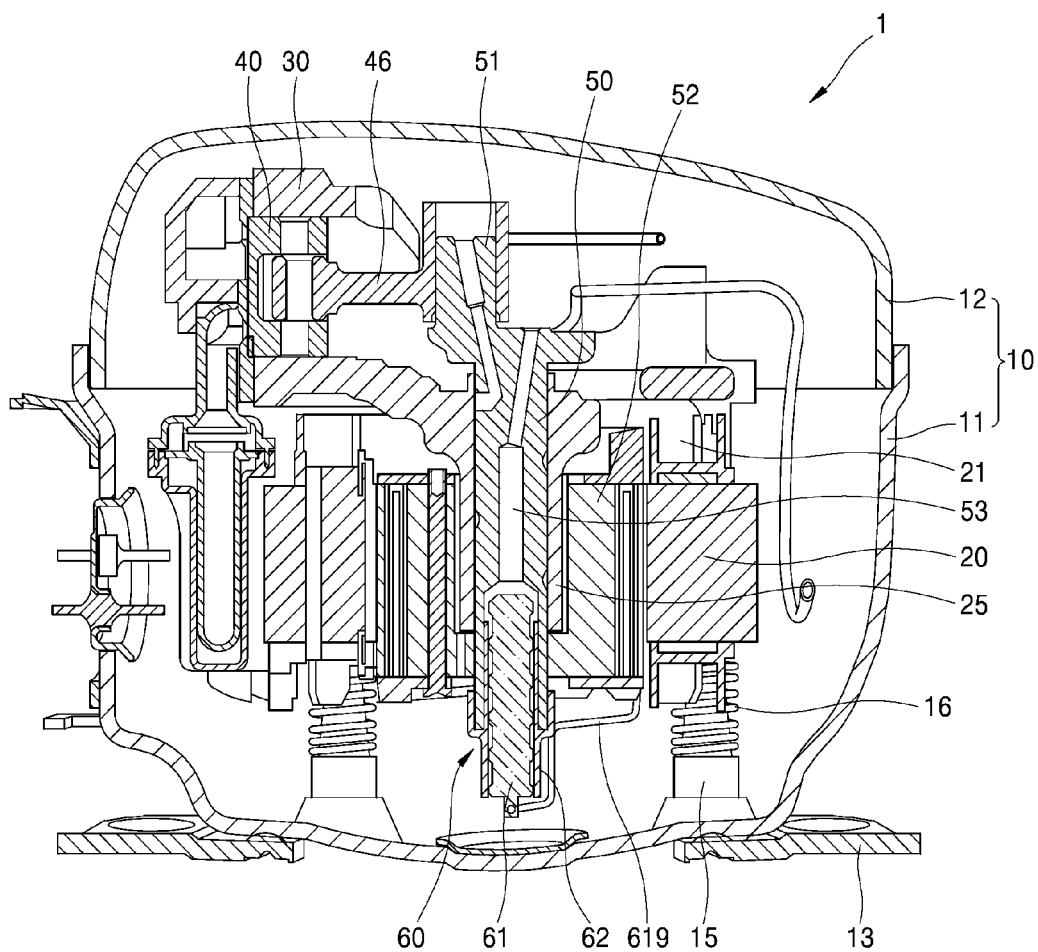
FIG. 1 is a side cross-sectional view of a reciprocating type compressor according to an embodiment.
Figure 2:
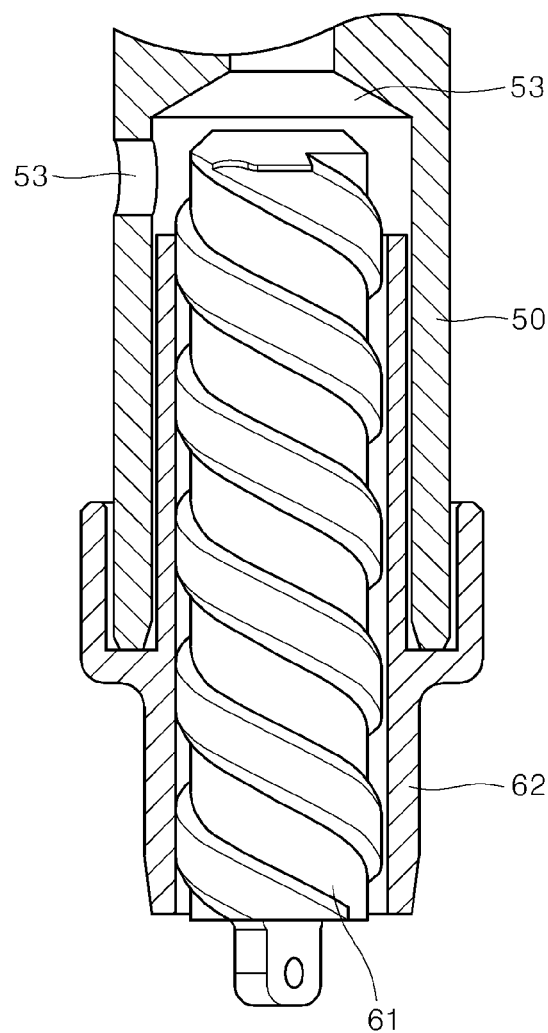
FIG. 2 illustrates the lubricating oil supply apparatus of the compressor of FIG. 1.

Hereinafter, embodiments will be described with reference to the accompanying drawings. Where possible, the same or similar reference numerals have been used to indicate the same or similar elements, and repetitive disclosure has been omitted.

Embodiments are not limited to the embodiments disclosed herein but may be implemented in various different forms. The embodiments are provided to make the description thorough and to fully convey the scope to those skilled in the art.

Figure 4:
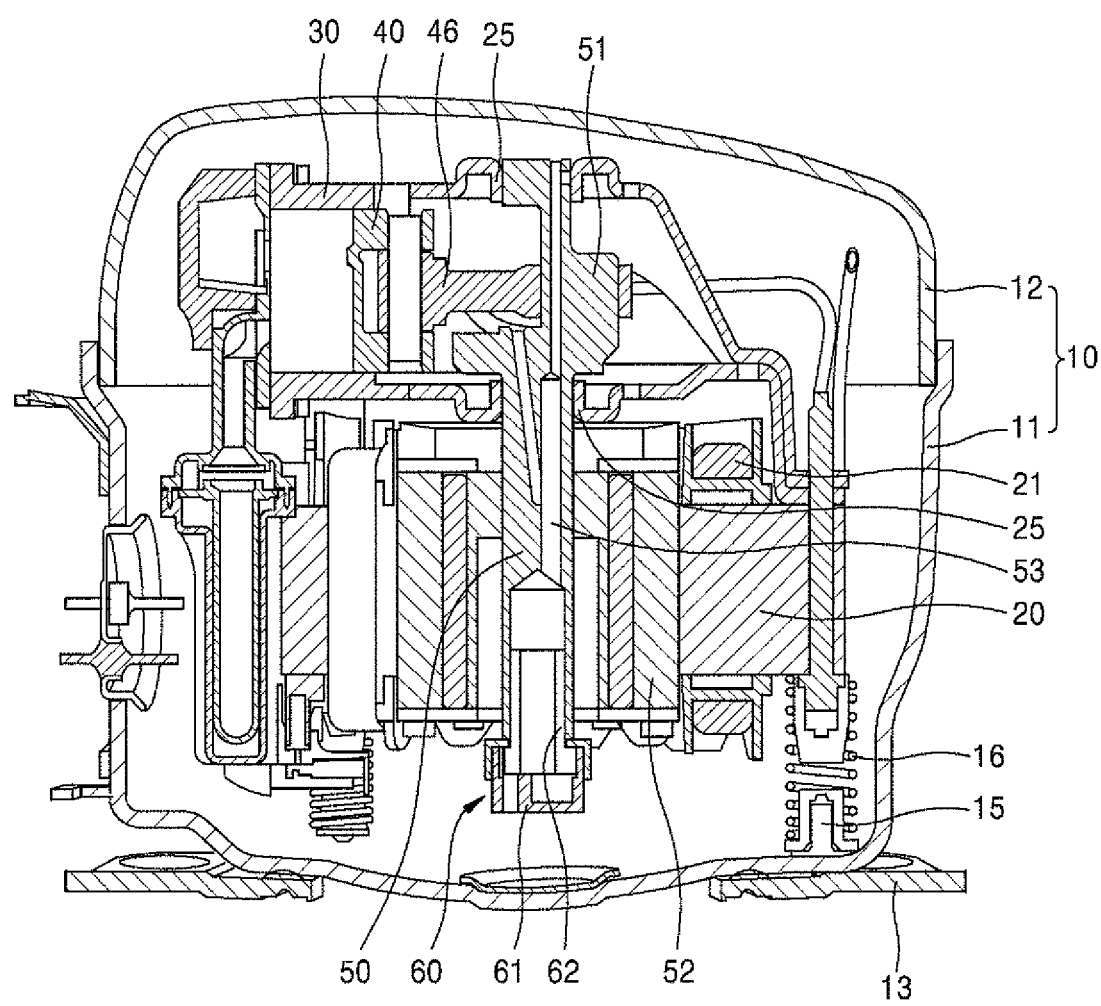
FIG. 4 is a side cross-sectional view of a compressor to which a lubricating oil supply apparatus according to an embodiment is applied.
Figure 5:
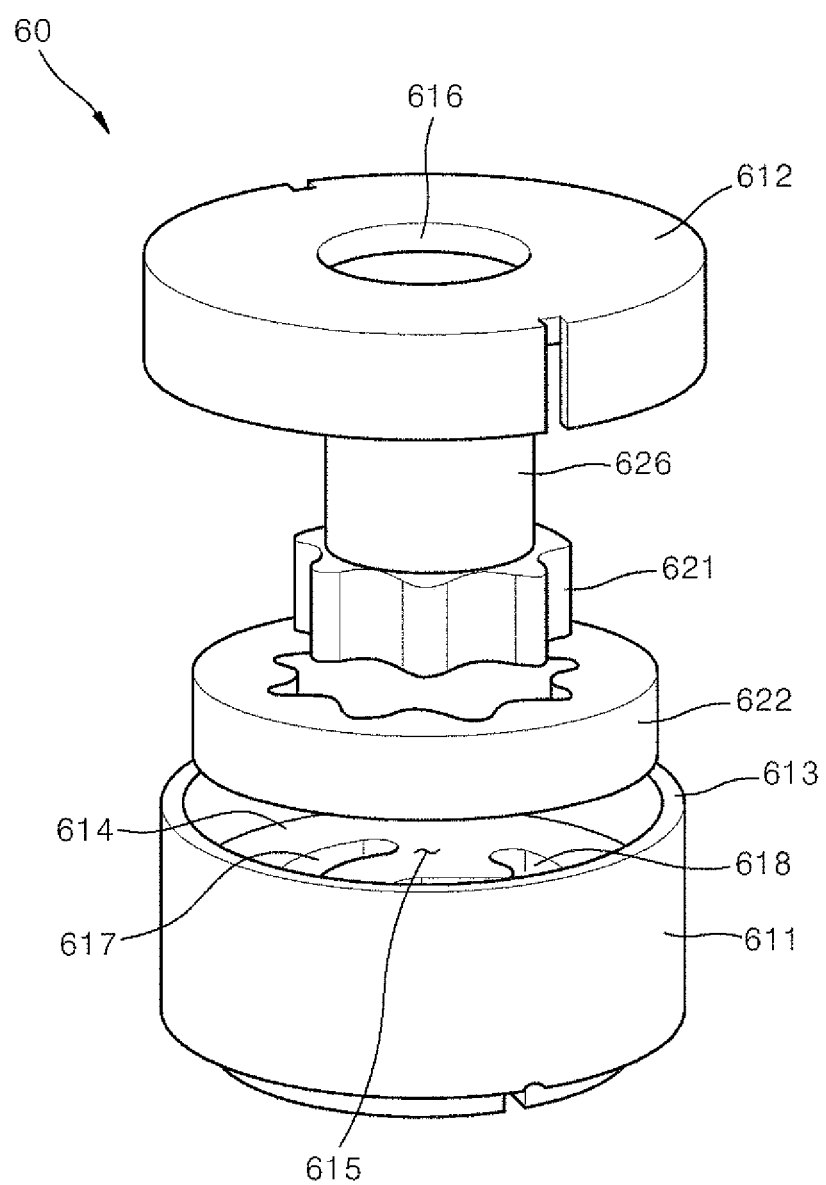
FIG. 5 is an exploded perspective view of the lubricating oil supply apparatus of FIG. 4.
Figure 6:
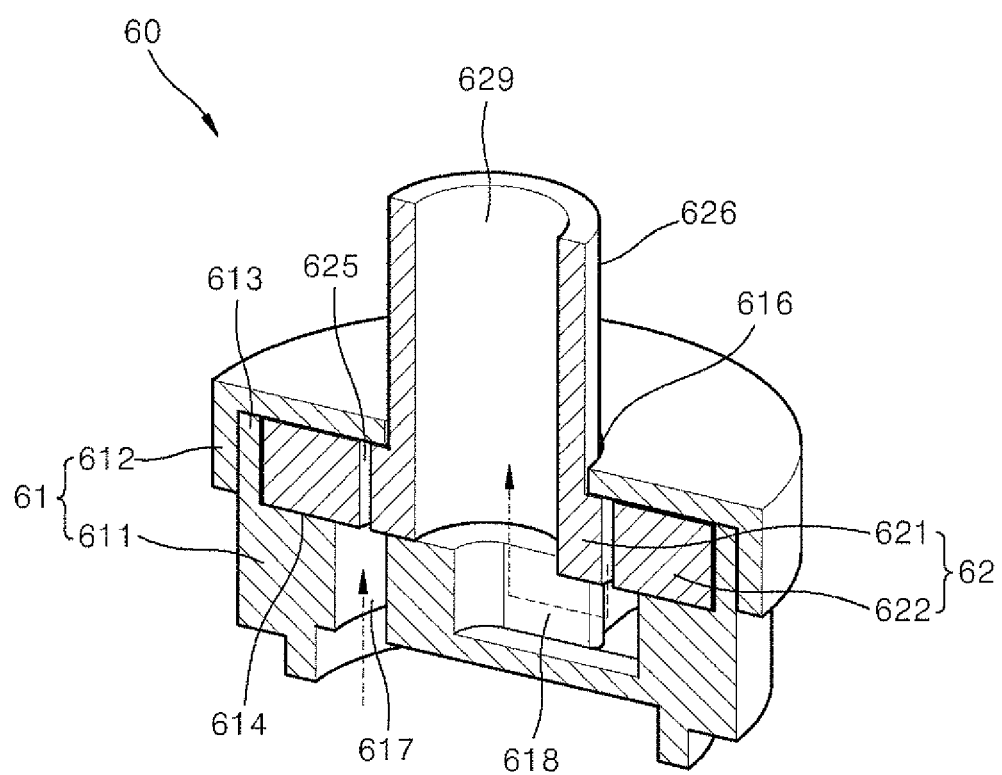
FIG. 6 is a cross-sectional perspective view of the lubricating oil supply apparatus of FIG. 5.

A structure of a compressor using a lubricating oil supply apparatus according to embodiments will be described with reference to FIG. 4. A compressor 1 exemplified in the embodiments is a reciprocating type compressor.

Each component of the compressor 1 may be installed in the housing 10. The housing 10 may include a main housing 11 having a shape of a deep container, and a cover housing or cover 12 to cover and seal an upper portion of the main housing 11. A leg 13 may be provided at a lower portion of the main housing 11. The leg 13 may be configured to fix the compressor 1 to an installation location.

A protrusion 15 may be provided at a bottom of an inner space of the housing 10. The protrusion 15 may fix an elastic device 16, such as, for example, a coil spring. A frame 20 may be fixed to an upper portion of the elastic device 16. The elastic device 16 may fix the frame 20 to the housing 10 while preventing the housing 10 and the frame 20 from being directly connected to each other. Therefore, it is possible to prevent vibration of the frame 20 from being transferred to the housing 10, by means of the elastic device 16.

A rotational supporting portion or support 25 of the frame 20 may support rotation of rotational shaft 50. The rotational shaft 50 may extend in a vertical direction, and may be rotatably supported by the frame 20 at two points. The rotational shaft 50 of the compressor may be supported at two points which respectively correspond to upper and lower portions of crank pin 51.

The rotational shaft 50 may rotate by means of a motor, and the motor may be inverter-controlled. A stator 21 may be fixed to the frame 20, and a rotor 52 may be fixed to the rotational shaft 50. The rotational shaft 50 may be rotated by inverter-control.

The crank pin 51 may be provided at an upper portion of the rotational shaft 50. The crank pin 51 may be parallel with the rotational shaft 50 while being located eccentrically from a center of the rotational shaft 50.

A cylinder 30 which extends in a horizontal direction may be provided at a height corresponding to a height of the crank pin 51. For reference, the cylinder 30 of the compressor of FIG. 1 may be constructed integrally with the rotational supporting portion 25 of the frame 20. The cylinder 30 of the compressor of FIG. 4 may be constructed as a separate component from the rotational supporting portion 25 and assembled with the rotational supporting portion 25. The piston 40 may reciprocate along a longitudinal direction of the cylinder 30 regardless of a rotational direction of the rotational shaft 50.

Lubricating oil supply portion 60 may be installed at a lower portion of the rotational shaft 50. Lubricating oil may be stored in a lower portion of an inner space of the housing 10. The lubricating oil supply portion 60 may be submerged in the lubricating oil. The lubricating oil supply portion 60 may be provided with fixed portion 61 fixed to the frame 20 and rotational portion 62 which rotates together with the rotational shaft 50. Rotation of the rotational portion 62 relative to the fixed portion 61 may pump the lubricating oil upward.

The rotational shaft 50 may be provided with hollow lubricating oil supply path 53. The lubricating oil supply path 53 may be formed to extend from a lower end of the rotational shaft 50 to a vicinity of a location where lubrication is required. For example, oil (lubricating oil) may be supplied to a friction portion between the cylinder 30 and the piston 40, a connecting portion between the crank pin 51 and connecting rod 46, a connecting portion between the connecting rod 46 and the piston 40, and a supporting portion of the rotational shaft 50.

The lubricating oil supplied to a place where the lubricating oil is needed may flow down or fall back to a bottom of the housing 10 by gravity after lubricating a relevant portion.

Hereinafter, the lubricating oil supply apparatus according to embodiments will be described with reference to FIGS. 4 to 9.

The lubricating oil supply apparatus 60 may include the fixed portion 61 and the rotational portion 62. The rotational portion 62 may be fixed to a lower end of the rotational shaft 50 of the compressor 1 and rotate together with the rotational shaft 50.

The fixed portion 61 may be fixed to the frame 20 of the lubricating oil supply apparatus 60 through a fixed connecting member 619. The fixed portion 61 may remain fixed even when the rotational shaft 50 rotates. The fixed portion 61 may remain fixed while supporting rotation of the rotational portion 62.

The fixed portion 61 may include a body portion that forms a body, that is, a first fixed portion 611, and a cover portion or cover that covers an upper portion of the body, that is, a second fixed portion 612.

An accommodation space 615 that accommodates the rotational portion 62 may be provided at an upper portion of the first fixed portion 611. The accommodation space 615, which may be a space defined by a side wall 613 and a bottom 614 of the first fixed portion 611, may be a cylindrical space which is short and flat. An upper portion of the accommodation space 615 may be open.

The upper portion of the accommodation space 615 may be covered by the second fixed portion 612. The second fixed portion 612 may be coupled to the first fixed portion 611 in a manner such that it surrounds the upper portion of the accommodation space 615 and an outer circumferential surface of the side wall 613. A central portion of the second fixed portion 612 may be provided with a circular through-hole 616.

The first fixed portion 611 may be provided with an oil inlet 617 and an oil chamber 618. The oil inlet 617 may have a shape in which the bottom 614 is penetrated in a vertical direction. Therefore, a space below the bottom 614 of the first fixed portion 611 and the accommodation space 615 may be connected to each other through the oil inlet 614.

Figure 7:
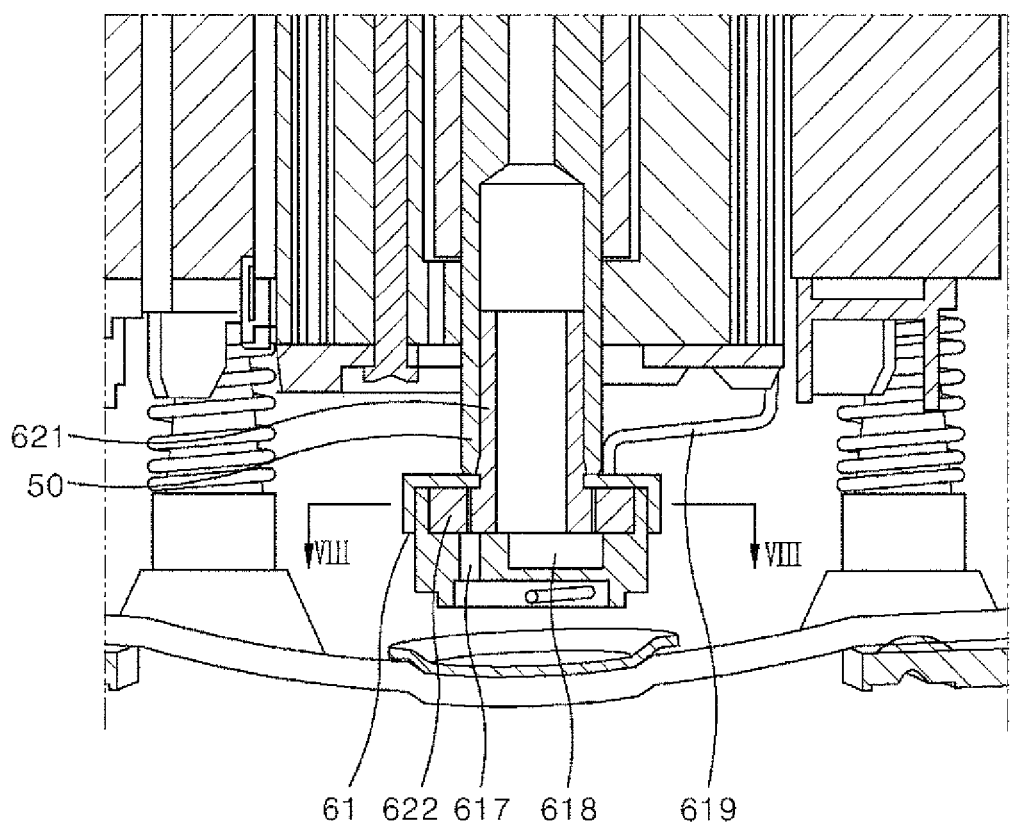
FIG. 7 is an enlarged view of a portion of the lubricating oil supply apparatus of FIG. 4.

The first fixed portion 611 may be almost submerged in oil as illustrated in FIG. 7. For reference, line VIII-VIII of FIG. 7 may be a reference line that represents a cross-section of FIG. 8, and may be a level of lubricating oil stored in the bottom of the housing 10. Therefore, the lubricating oil stored in the housing 10 may be introduced into the accommodation space 615 through the oil inlet 617.

The oil chamber 618 may be a groove formed in an upper surface of the bottom portion. That is, the oil chamber 618 may be a recessed space from an upper surface of the bottom 614. A lower surface of the oil chamber 618 may be closed. Therefore, even when the first fixed portion 611 is submerged in oil as illustrated in FIG. 7, oil outside the first fixed portion 611 is required to pass through the oil inlet 617 so as to enter the oil chamber 618.

Figure 8:
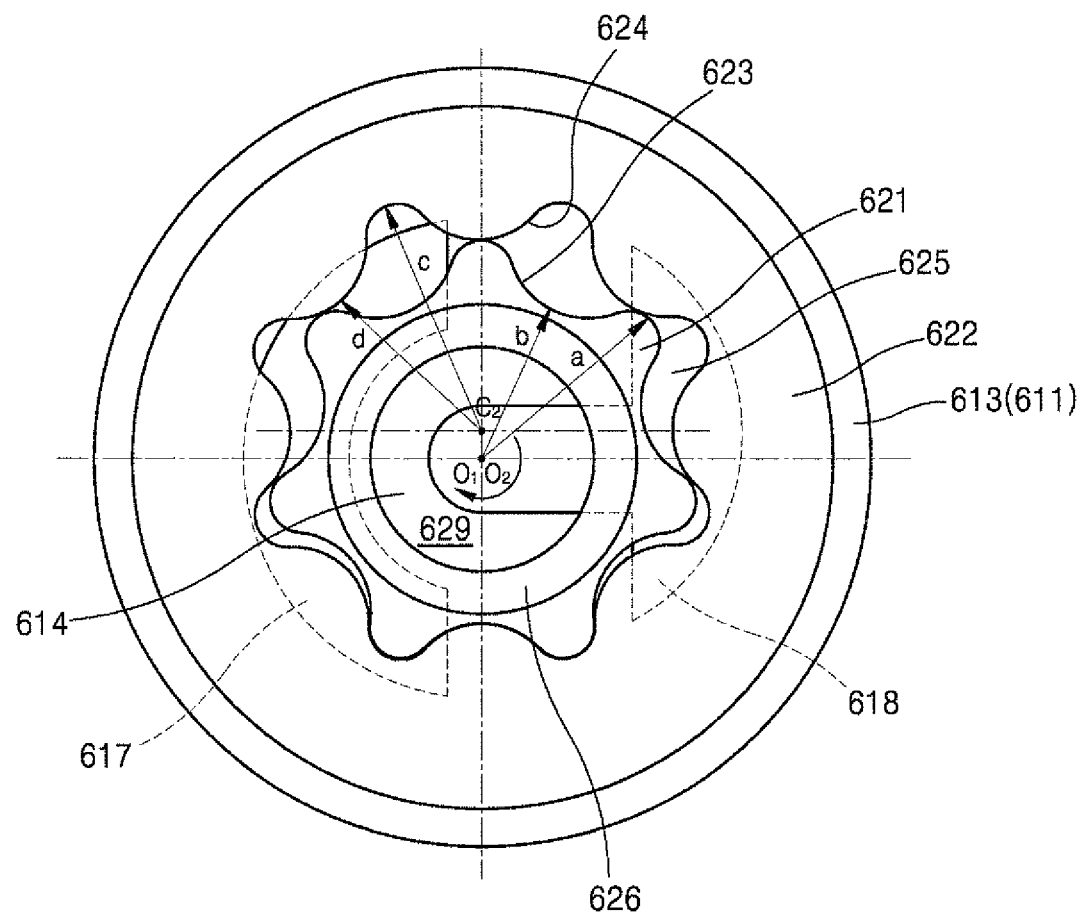
FIG. 8 is a cross-sectional view, taken along line VIII-VIII of FIG. 7.

Referring to FIG. 8, a cross-section of the oil inlet 617 may be penetrated in a circular arc shape at a location deviated from a center of the first fixed portion 611. The oil chamber 618 may have a groove shape including circular arc shape within a range that does not overlap the oil inlet 617 and the center of the first fixed portion 611. The oil chamber 618 may be substantially similar to a T shape.

A first rotational portion 621 and a second rotational portion 622 may be accommodated in the accommodation space 615. A shaft coupling portion 626 that extends upward from a center of the first rotational portion 621 may pass through the through-hole 616 of the second fixed portion 612 to be exposed upward.

The shaft coupling portion 626 may be inserted and fixed to an inner diameter portion or diameter or inner circumferential surface of the rotational shaft 50. When the rotational shaft 50 rotates, the shaft coupling portion 626 may also rotate together therewith, and thus, the first rotational portion 621 may rotate together therewith. The second rotational portion 622 which is installed to receive a rotational force from the first rotational portion 621 may also rotate.

An outer diameter portion or diameter or outer circumferential surface of the second rotational portion 622 accommodated in the accommodation space 615 may face an inner diameter portion or diameter or inner circumferential surface of the side wall 613 of the first fixed portion 611, and may be guided to rotate.

A part or portion of the first rotational portion 621 and the second rotational portion 621 accommodated in the accommodation space 615 may be supported by an upper surface of the bottom 614 of the first fixed portion 611, and may be supported by a lower surface of the second fixed portion 612. In this manner, the second rotational portion 622 may be installed in the fixed portion 61 so as to be rotatable with respect to a rotational center O2 thereof.

The first rotational portion 621 may be also rotatably installed in the fixed portion 61. The first rotational portion 621 may rotate together with the rotational shaft 50, and thus, a rotational center O1 of the first rotational portion 62 may correspond to a rotational center of the rotational shaft 50.

An oil outlet 629 that penetrates in the vertical direction may be formed in the shaft coupling portion 626 of the first rotational portion 621. An upper opening of the oil outlet 629 may communicate with the lubricating oil supply path 53 of the rotational shaft 50, and a lower opening of the oil outlet 629 may communicate with the oil chamber 618. The lubricating oil supply path 53 may not overlap the oil inlet 617. Therefore, oil outside the first fixed portion 611 may sequentially pass through the oil inlet 617, the accommodation space 615, the oil chamber 618, and the oil outlet 629 to be supplied to the lubricating oil supply path 53.

The first rotational portion 621 and the second rotational portion 622 may rotate in a state of being accommodated in the accommodation space 615. Referring to FIG. 8, the rotational center O1 of the first rotational portion 621 and the rotational center O2 of the second rotational portion 622 may correspond to each other.

The outer diameter portion of the first rotational portion 621 accommodated in the accommodating space 615 may be provided with a first tooth portion 623 having a shape that protrudes outward. A plurality of first tooth portions 623 may be formed radially with respect to the rotational center O1 of the first rotational portion 621. Therefore, the first tooth portion 623 may rotates with respect to the rotational center O1 of the first rotational portion 621. The embodiments exemplify a structure in which seven first tooth portions 623 are provided.

The inner diameter portion of the second rotational portion 622 that surrounds the first rotational portion 621 may be provided with a second tooth portion 624 that protrudes inward. A plurality of second tooth portions 624 may be formed radially with respect to the center C2 thereof. A number of the second tooth portions 624 may be greater than a number of the first tooth portions 623. The embodiments exemplify a structure in which eight second tooth portions 624 are provided.

The tooth portions 623 and 624 may be formed in a shape that they correspond to each other, and thus, may be engaged with each other. Profiles of the tooth portions may have a trochoid shape.

A radius b of a dedendum circle of the first tooth portion 623 may be less than a radius d of an addendum circle of the second tooth portion 624. A radius a of an addendum circle of the first tooth portion 623 may be greater than the radius d of the addendum circle of the second tooth portion 624, and may be less than a radius c of a dedendum circle of the second tooth portion 624.

According to embodiments, the center C2 of the second tooth portion 624 may be eccentric from the center O2 of the second rotational portion 622. The eccentric distance may be equal to or slightly less than a difference between the radius c of the dedendum circle of the second tooth portion 624 and the radius a of the addendum circle of the first tooth portion 623. Therefore, a space portion or space 625 may be present between the first tooth portion 623 and the second tooth portion 624.

A volume of the space portion 625 may be distributed more at a side close to the center C2 of the second tooth portion 624 on the basis of the rotational centers O1 and O2. Conversely, the first tooth portion 623 and the second tooth portion 624 may be engaged with each other at a side farther from the center C2 of the second tooth portion on the basis of the rotational centers O1 and O2.

The rotational centers O1 and O2 may correspond to each other. Accordingly, when the rotational shaft 50 rotates, the first rotational portion 621 and the second rotational portion 622 may concentrically rotate together. However, as the center C2 of the second tooth portion 624 is eccentric from the center O2 of the second rotational portion 622, the second tooth portion 624 may circle with respect to the rotational center O2 of the second rotational portion 622. Therefore, the space portion 625 may also circle with respect to the rotational center O2 of the second rotational portion 622.

According to such a rotational movement, the first rotational portion 621 and the second rotational portion 622 may rotate at a constant speed while maintaining a location where the tooth portion 623 and the second tooth portion 624 are engaged with each other.

The oil inlet 617 of the first fixed portion 611 may be at a location that overlaps a turning locus of the space portion 625. Thus, when the rotational portion 62 rotates in a state in which the oil inlet 617 and the space portion 625 overlap each other, oil introduced into the space portion 625 through the oil inlet 617 may circle together in a state of being stuck in the space portion 625.

The oil chamber 618 may also be at a location that overlaps a turning locus of the space portion 625. Therefore, the oil that is moved through the accommodation space 615 in a state of being stuck in the space 625 may fall to the oil chamber 618 by gravity. The oil that falls to the oil chamber 618 may be forcedly introduced into the oil chamber 618 with a linear velocity of the space portion 625, and thus, the oil filled in the oil chamber 618 may be pushed upward through the oil outlet 629.

In FIG. 8, an arrow indicates a shape of the rotational portion 62 that rotates clockwise. However, according to the above-described principle, even when the rotational portion 62 rotates counterclockwise, a lubricating oil supply action may occur to the same extent as when the rotational portion 62 rotates clockwise. Therefore, the lubricating oil supply apparatus according to embodiments may supply lubricating oil regardless of a rotational direction of the rotational shaft 50.

When the lubricating oil supply apparatus is applied to a reciprocating type compressor, both a compression operation and a lubricating oil supply operation may be performed properly regardless of a rotational direction of the rotational shaft. Therefore, a maximum efficiency speed range when the motor rotates in a normal direction may be designed differently from that when the motor rotates in a reverse direction, thereby enhancing the efficiency of the compressor at a wider range of operating speed of the compressor.

Figure 9:
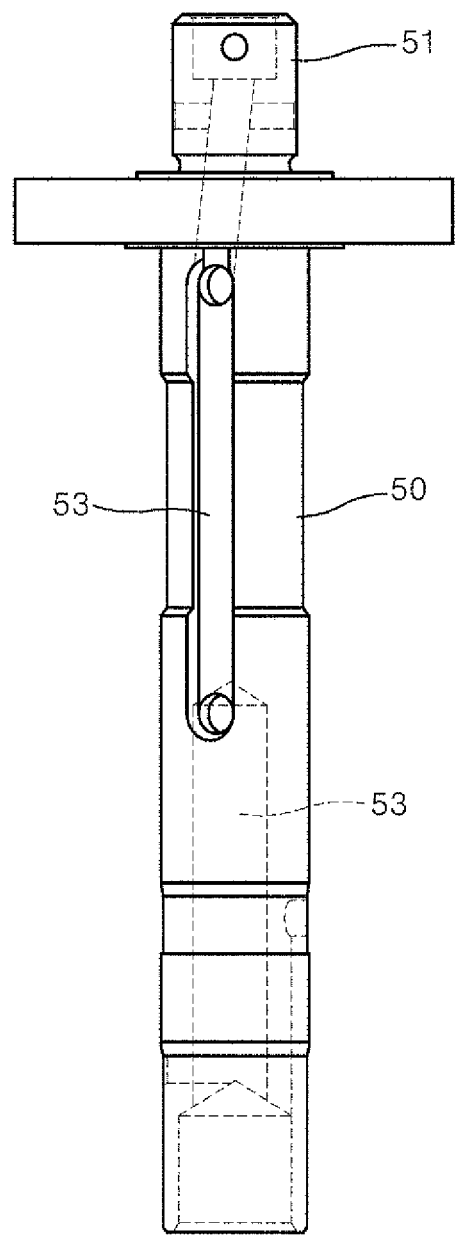
FIG. 9 is a side cross-sectional view of a rotational shaft on which a lubricating oil supply apparatus according to embodiments is to be installed.

FIG. 9 illustrates an embodiment in which the lubricating oil supply path 53 is formed in the rotational shaft 50 which is expected to rotate bi-directionally. The lubricating oil supply path 53 may be provided in an inner diameter portion of the lower portion of the rotational shaft 50, and may be branched and extend upward. That is, a part or portion of the lubricating oil supply path 53 may extend through an interior of the rotational shaft 50 as illustrated in FIG. 4, and a part or portion of the lubricating oil supply path 53 may extend in a groove shape in the outer diameter portion of the rotational shaft 50.

Figure 3:
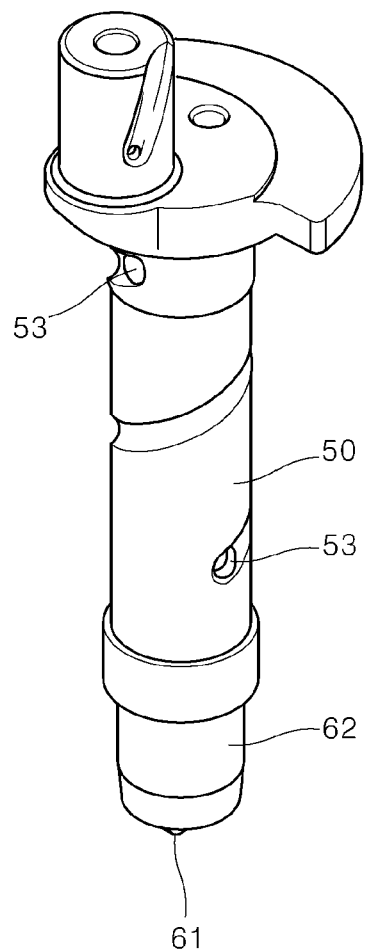
FIG. 3 is a perspective view of a rotational shaft of the compressor of FIG. 1.

Unlike FIG. 3, the groove-shaped lubricating oil supply path 53 provided in the outer diameter portion of the rotational shaft 50 of FIG. 9 may be formed in a straight line shape parallel to a longitudinal direction of the rotational shaft 50. This structure may allow oil to move upward regardless of a rotational direction.

The above-described embodiment exemplifies a structure in which the rotational portion 62 is divided into the first rotational portion and the second rotational portion, and the first rotational portion and the second rotational portion are fastened. In contrast, even though the rotational portion 62 is constructed as a single component, when the space portion 625 is formed at a location spaced apart from the rotational center of the rotational portion 62 in a radial direction, and the oil inlet 617 and the oil chamber 618 overlap the turning locus of the space portion 625, it may be expected that the same operation is performed. This configuration may be also within the technical idea.

However, the above-described embodiment may be more advantageous in that it is possible to share components with a lubricating oil supply apparatus capable of supplying lubricating oil when rotating uni-directionally as described below.

Figure 10:
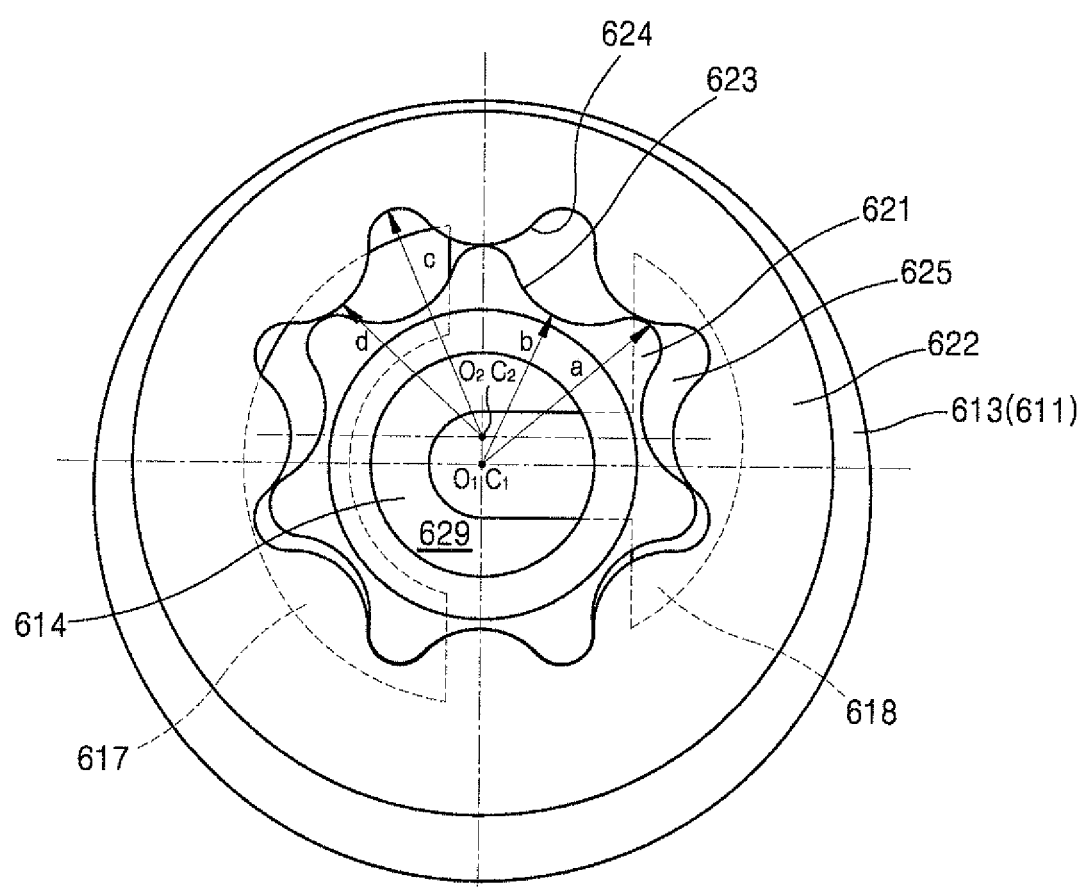
FIG. 10 is a cross-sectional view of a lubricating oil supply apparatus which may share components with a lubricating oil supply apparatus according to embodiments.

For example, FIG. 10 illustrates the lubricating oil supply apparatus capable of supplying lubricating oil when rotating uni-directionally. FIG. 10 differs from FIG. 8 in that rotational center O2 of second rotational portion 622 is eccentric from rotational center O1 of first rotational portion 621, and corresponds to rotational center C2 of second tooth portion 624 formed in the inner diameter portion of second rotational portion 622.

In the lubricating oil supply apparatus of FIG. 10, when the first rotational portion 621 rotates as the rotational shaft 50 rotates, a rotational force of the first rotational portion 621 may also be transferred to the second rotational portion 622 through the first tooth portion 623 and the second tooth portion 624 in the same manner as illustrated in FIG. 8. However, unlike FIG. 8, the center C2 of the second tooth portion 624 may correspond to the center O2 of the second rotational portion 622, and thus, the second tooth portion 624 may rotate in place without circling with respect to the center of the first rotational portion 621. That is, the first tooth portion 623 may rotate with respect to the center C1 thereof, and the second tooth portion 624 may also rotate with respect to the center C2 thereof.

Therefore, the space portion 625 may also maintain its position without circling. But, when the rotational portion 62 rotates clockwise, the two tooth portions 623 and 624 may rotate, and accordingly, the space portion 625 may be gradually narrowed from the oil inlet 617 toward the oil chamber 618. Therefore, oil that moves together with the tooth portions in a state of being stuck in the space portion 625 may be pressed by the gradually narrowed space portion 625 to be pushed out to the oil chamber 618, and the oil may move upward through the oil outlet 629. According to this structure, when the rotational portion 62 rotates counterclockwise in FIG. 10, oil may not be supplied.

A geometrical difference between FIG. 8 and FIG. 10 may be merely a difference in a location of the rotational center O2 of the second rotational portion 622. Due to this location change of the rotational center O2, the lubricating oil supply apparatus may be a unidirectional supply apparatus or a bidirectional supply apparatus.

Figure 11:
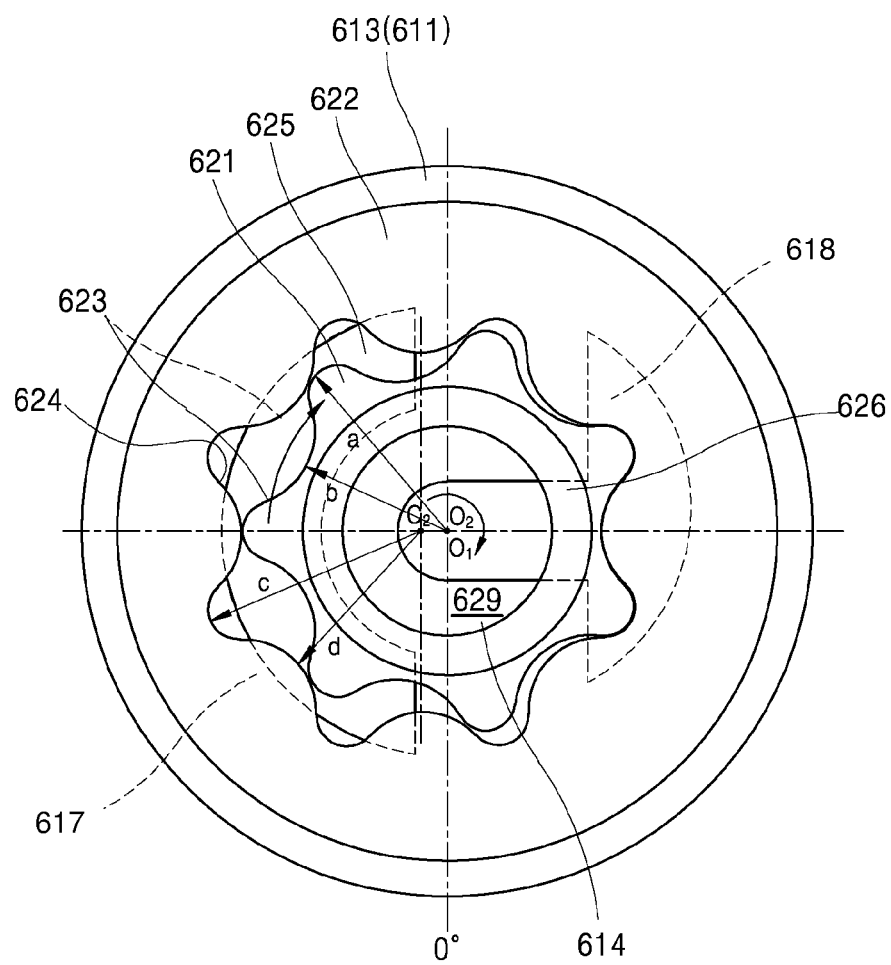
FIGS. 11-14 show operation of the lubricating oil supply apparatus according to embodiments at every 90° of rotation.
Figure 12:
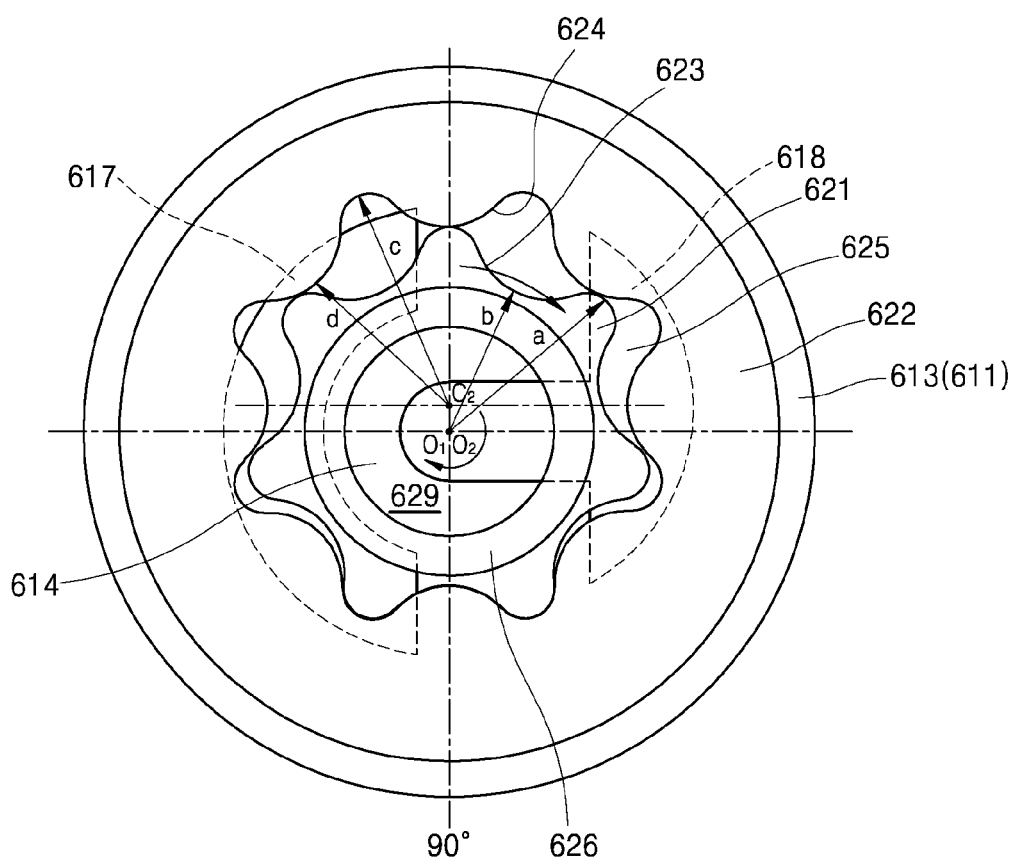

FIGS. 11-14 show operation of the lubricating oil supply apparatus according to embodiments at every 90° of rotation. As shown in FIG. 11, when the first rotational portion 621 and the second rotational portion 622 of the lubricating oil supply portion 60 are in an initial position of 0°, oil is supplied to the space portion 625 through the oil inlet 617. As shown in FIG. 12, if the first rotational portion 621 and the second rotational portion 622 rotate 90°, oil filled in the space portion 625 is also rotated at 90°.

Figure 13:
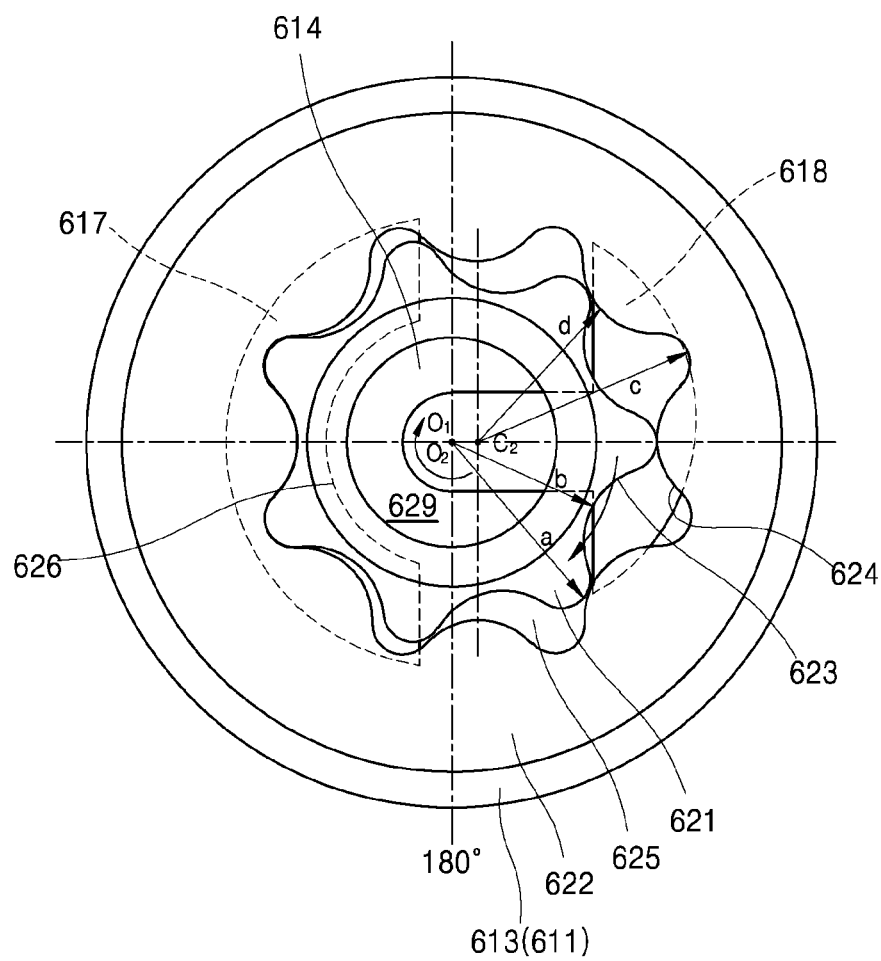
Figure 14:
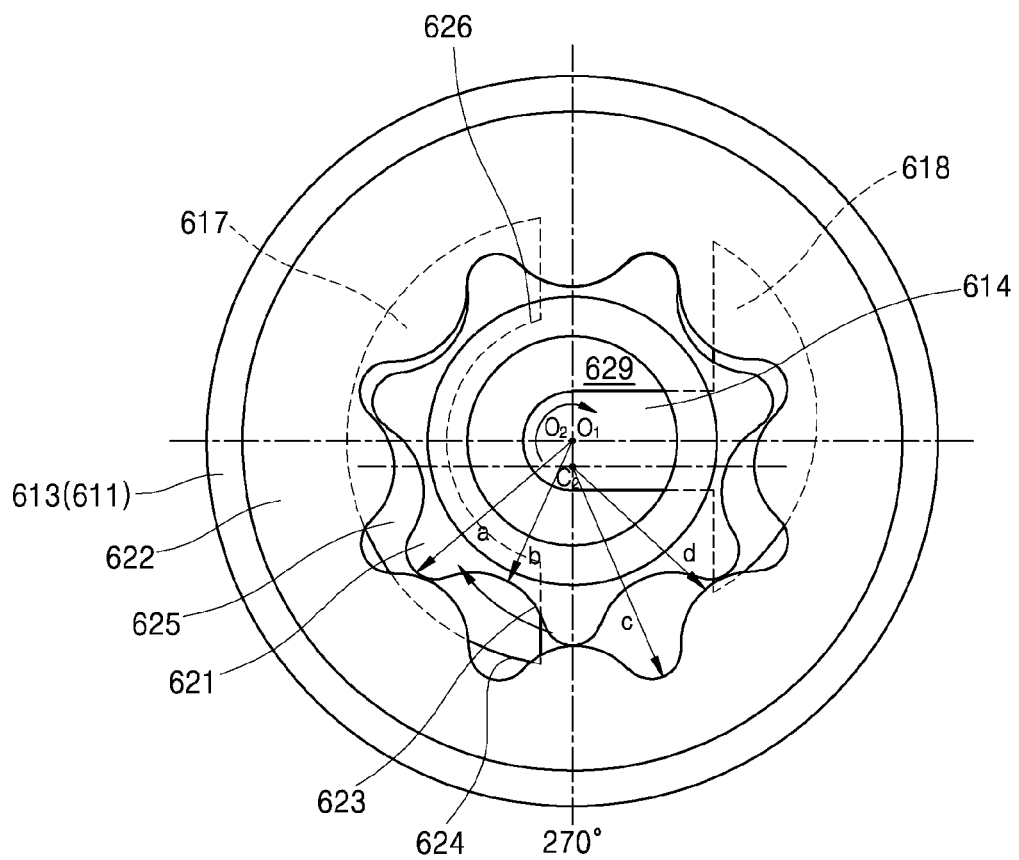

As shown in FIG. 13, the first rotational portion 621 and the second rotational portion 622 rotate 180° from the initial position. Further, oil filled in the space portion 625 is also rotated 180° from the initial position. Oil filled in the space portion 625 falls to the oil chamber 618. As shown in FIG. 14, the first rotational portion 621 and the second rotational portion 622 rotate 270° from the initial position. Further, oil filled in the space portion 625 also rotates 270° from the initial position. Oil filled in the space portion 625 falls to the oil chamber 618, and then is pushed upward through the oil outlet 629.

Therefore, when the above-described configuration is included, the lubricating oil unidirectional supply apparatus and bidirectional supply apparatus may share components with each other. For example, the two supply apparatuses may be different from each other in terms of components of the first fixed portion and the second rotational portion, and may share components of the second fixed portion and the first rotational portion.

Embodiments are described with reference to illustrative drawings, but is not limited by the embodiments described herein and accompanying drawings. It should be apparent to those skilled in the art that various changes which are not exemplified herein but are still within the spirit and scope may be made. Further, it should be apparent that, although an effect from a configuration of the embodiments is not clearly described in the embodiments, any effect, which can be predicted from the corresponding configuration, is also to be acknowledged.

Embodiments provide a lubricating oil supply apparatus capable of supplying oil regardless of a rotational direction and a compressor using a lubricating oil supply apparatus.

According to embodiments disclosed herein, there is provided a lubricating oil supply apparatus. The lubricating oil supply apparatus may be installed at one or a first end of a rotational shaft provided with a hollow lubricating oil supply path formed along a longitudinal direction of the rotational shaft to supply lubricating oil to the lubricating oil supply path. The lubricating oil supply apparatus may include a fixed portion provided with an oil inlet, an inner space that communicates with the oil inlet and an oil chamber that communicates with the oil inlet through the inner space without directly communicating with the oil inlet, and a rotational portion accommodated in the inner space of the fixed portion and coupled to the rotational shaft to rotate together with the rotational shaft. The rotational portion may include a space portion or space provided at a location spaced apart from a rotational center of the rotational portion in a radial direction to circle with respect to the rotational center of the rotational portion as the rotational portion rotates, and an oil outlet provided at the rotational center of the rotational portion to be connected to the oil chamber and the lubricating oil supply path. The oil inlet and the oil chamber each may be provided at a location that faces a turning locus of the space portion. Therefore, as the rotational portion rotates, oil introduced into the space portion through the oil inlet may move together in a state of being stored in the space portion, and the oil may be supplied from the space portion to the oil chamber when the space portion faces the oil chamber, and the oil in the oil chamber may be supplied to the lubricating oil supply path through the oil outlet.

The fixed portion may include a first fixed portion that is provided with the oil inlet, the inner space and the oil chamber and accommodates the rotational portion, and a second fixed portion that covers the inner space in a state where the rotational portion is accommodated in the inner space of the first fixed portion. The rotational portion may be provided with a shaft coupling portion that passes through the second fixed portion to be fastened to the rotational shaft, and the oil outlet may be provided in the shaft coupling portion.

The rotational portion may include a first rotational portion provided with a shaft coupling portion that passes through the fixed portion to be fastened to the rotational shaft and a first tooth portion that is connected to the shaft coupling portion, accommodated in an accommodation space of the fixed portion and formed radially outward with respect to a center of the shaft coupling portion, and a second rotational portion accommodated in the space portion and provided with a second tooth portion that is formed inward while surrounding the first tooth portion. The first tooth portion and the second tooth portion may be partially engaged with each other. A space between the first tooth portion and the second tooth portion may define the space portion.

A rotational center of the first rotational portion and a rotational center of the second rotational portion may correspond to each other. A center of the second tooth portion may be located eccentrically from the rotational center.

A tooth profile of the first tooth portion and a tooth profile of the second tooth portion may correspond to each other to be engaged with each other. A number of teeth of the second tooth portion may be greater than a number of teeth of the first tooth portion.

A radius of a dedendum circle of the first tooth portion may be less than a radius of an addendum circle of the second tooth portion A radius of an addendum circle of the first tooth portion may be greater than a radius of an addendum circle of the second tooth portion, and may be less than a radius of a dedendum circle of the second tooth portion.

A distance that the center of the second tooth portion is eccentric from the rotational center may be equal to or less than a difference between the radius of the dedendum circle of the second tooth portion and the radius of the addendum circle of the first tooth portion.

According to embodiments disclosed herein, there is also provided a compressor. The compressor may include the lubricating oil supply apparatus, the rotational shaft provided with the lubricating oil supply apparatus at one on a first end thereof, a frame provided with a rotational supporting portion to support rotation of the rotational shaft, a motor provided in the rotational shaft and the frame to rotate the rotational shaft in a first direction and a second direction opposite to the first direction with respect to the frame, and a housing in which lubricating oil is stored in a lower portion thereof and the frame is accommodated in an upper portion of the lubricating oil storage space. At least a part or portion of the lubricating oil supply apparatus may be submerged in the lubricating oil.

The compressor may further include a cylinder whose location relative to the frame is fixed, a piston that is inserted into the cylinder to reciprocate along a longitudinal direction of the cylinder, a crank pin that is provided in the rotational shaft, is provided at a location eccentric from a longitudinal direction of the rotational shaft, and extends in a direction parallel to the longitudinal direction of the rotational shaft, and a connecting rod that has one or a first end hinged to the piston and the other or a second end rotatably coupled to the crank pin.

The lubricating oil supply path may be provided on an outer circumferential surface of the rotational shaft. The lubricating oil supply path of the outer circumferential surface may be formed to be parallel to the longitudinal direction of the rotational shaft.

The lubricating oil supply apparatus according to embodiments disclosed herein may supply oil by using a rotational force of a rotational shaft regardless of a rotational direction of the rotational shaft, thereby providing for a compressor that is rotatable bi-directionally. Therefore, it is possible to design efficiency of the motor differently depending on a rotational direction, thereby designing a high-efficiency compressor.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lubricating oil supply apparatus for a bidirectionally rotating compressor, the lubricating oil supply apparatus installed at a first end of a rotational shaft provided with a lubricating oil supply path formed along a longitudinal direction of the rotational shaft to supply lubricating oil to the lubricating oil supply path, wherein the lubricating oil supply apparatus comprises:

a fixed portion provided with an oil inlet, an accommodation space that communicates with the oil inlet, and an oil chamber that communicates with the oil inlet through the accommodation space without directly communicating with the oil inlet; and a rotational portion accommodated in the accommodation space of the fixed portion and coupled to the rotational shaft to rotate together with the rotational shaft, wherein the rotational portion comprises:

a space provided at a location spaced apart from a rotational center of the rotational portion in a radial direction and encircling the rotational center of the rotational portion as the rotational portion rotates; and an oil outlet provided at the rotational center of the rotational portion to be connected to the oil chamber and the lubricating oil supply path, and wherein the oil inlet and the oil chamber are each provided at a location facing a turning locus of the space so that, as the rotational portion rotates, oil introduced into the space through the oil inlet moves together in a state of being stored in the space, and the oil is supplied from the space to the oil chamber when the space faces the oil chamber, and the oil in the oil chamber is supplied to the lubricating oil supply path through the oil outlet, wherein the rotational portion further comprises:

a first rotational portion provided with a shaft coupling portion that passes through the fixed portion to be fastened to the rotational shaft, and a first tooth portion connected to the shaft coupling portion, accommodated in the accommodation space of the fixed portion, and formed radially outward with respect to a center of the shaft coupling portion; and a second rotational portion provided with a second tooth portion formed inward while surrounding the first tooth portion, the second rotational portion being accommodated in the accommodation space, wherein the first tooth portion and the second tooth portion are partially engaged with each other, wherein a space between the first tooth portion and the second tooth portion defines the space, wherein the first rotational portion and the second rotational portion rotate at a constant speed while maintaining a location at which the first tooth portion and the second tooth portion are engaged with each other, wherein a rotational center of the first rotational portion and a rotational center of the second rotational portion are coincident to each other, wherein a center of the second tooth portion is located eccentrically from the rotational center, wherein a tooth profile of the first tooth portion and a tooth profile of the second tooth portion are coincident to each other to be engaged with each other, wherein a radius of a dedendum circle of the first tooth portion is less than a radius of an addendum circle of the second tooth portion, and wherein a radius of an addendum circle of the first tooth portion is greater than a radius of an addendum circle of the second tooth portion and is less than a radius of a dedendum circle of the second tooth portion.

2. The lubricating oil supply apparatus of claim 1, wherein the fixed portion comprises:
a first fixed portion that is provided with the oil inlet, the accommodation space, and the oil chamber and accommodates the rotational portion; and
a second fixed portion that covers the accommodation space in a state in which the rotational portion is accommodated in the accommodation space of the first fixed portion.

3. The lubricating oil supply apparatus of claim 2, wherein the shaft coupling portion passes through the second fixed portion to be fastened to the rotational shaft, and wherein the oil outlet is provided in the shaft coupling portion.

4. The lubricating oil supply apparatus of claim 1, wherein a number of teeth of the second tooth portion is greater than a number of teeth of the first tooth portion.

5. The lubricating oil supply apparatus of claim 1, wherein a distance that the center of the second tooth portion is eccentric from the rotational center is equal to or less than a difference between the radius of the dedendum circle of the second tooth portion and the radius of the addendum circle of the first tooth portion.

6. A compressor comprising the lubricating oil supply apparatus of claim 1.

7. A compressor, comprising:
a rotational shaft provided with a lubricating oil supply path formed along a longitudinal direction of the rotational shaft;
a frame provided with a rotational support to support rotation of the rotational shaft;
a motor provided on the rotational shaft and the frame to rotate the rotational shaft in a first direction and a second direction opposite to the first direction with respect to the frame;
a housing in which lubricating oil is stored at a lower portion thereof and the frame is accommodated at an upper portion of a lubricating oil storage space; and
a lubricating oil supply apparatus installed at a first end of the rotational shaft, wherein at least a portion of the lubricating oil supply apparatus is submerged in the lubricating oil storage space to supply the lubricating oil to the lubricating oil supply path, wherein the lubricating oil supply apparatus comprises:
a fixed portion provided with an oil inlet, an accommodation space that communicates with the oil inlet, and an oil chamber that communicates with the oil inlet through the accommodation space without directly communicating with the oil inlet; and
a rotational portion accommodated in the accommodation space of the fixed portion and coupled to the rotational shaft to rotate together with the rotational shaft, wherein the rotational portion comprises:
a space provided at a location spaced apart from a rotational center of the rotational portion in a radial direction and encircling the rotational center of the rotational portion as the rotational portion rotates; and
an oil outlet provided at the rotational center of the rotational portion to be connected to the oil chamber and the lubricating oil supply path, and wherein the oil inlet and the oil chamber each are provided at a location that faces a turning locus of the space so that, as the rotational portion rotates, oil introduced into the space through the oil inlet moves together in a state of being stored in the space, and the oil is supplied from the space to the oil chamber when the space faces the oil chamber, and the oil in the oil chamber is supplied to the lubricating oil supply path through the oil outlet, wherein the rotational portion further comprises:
a first rotational portion provided with a shaft coupling portion that passes through the fixed portion to be fastened to the rotational shaft, and a first tooth portion connected to the shaft coupling portion, accommodated in the accommodation space of the fixed portion, and formed radially outward with respect to a center of the shaft coupling portion; and
a second rotational portion provided with a second tooth portion formed inward while surrounding the first tooth portion, the second rotational portion being accommodated in the accommodation space, wherein the first tooth portion and the second tooth portion are partially engaged with each other, wherein a space between the first tooth portion and the second tooth portion defines the space, wherein the first rotational portion and the second rotational portion rotate at a constant speed while maintaining a location at which the first tooth portion and the second tooth portion are engaged with each other, wherein a rotational center of the first rotational portion and a rotational center of the second rotational portion are coincident to each other, wherein a center of the second tooth portion is located eccentrically from the rotational center, wherein a tooth profile of the first tooth portion and a tooth profile of the second tooth portion are coincident to each other to be engaged with each other, wherein a radius of a dedendum circle of the first tooth portion is less than a radius of an addendum circle of the second tooth portion, and wherein a radius of an addendum circle of the first tooth portion is greater than a radius of an addendum circle of the second tooth portion and is less than a radius of a dedendum circle of the second tooth portion.

8. The compressor of claim 7, further comprising:
a cylinder whose location relative to the frame is fixed;
a piston that is inserted into the cylinder to reciprocate along a longitudinal direction of the cylinder;
a crank pin that is provided in the rotational shaft at a location eccentric from the longitudinal direction of the rotational shaft, and extends in a direction parallel to the longitudinal direction of the rotational shaft; and
a connecting rod that has a first end hinged to the piston and a second end rotatably coupled to the crank pin.

9. The compressor of claim 7, wherein the lubricating oil supply path is provided at an outer circumferential surface of the rotational shaft, and wherein the lubricating oil supply path of the outer circumferential surface is formed to be parallel to the longitudinal direction of the rotational shaft.

* * * * *